(12) United States Patent
Yan et al.

(10) Patent No.: US 7,569,803 B2
(45) Date of Patent: Aug. 4, 2009

(54) BIASING APPARATUS, SYSTEMS, AND METHODS

(75) Inventors: Hai Yan, Fontana, CA (US); Chris Zeleznik, Los Angeles, CA (US); Chiajen Lee, Irvine, CA (US)

(73) Assignee: Aptina Imaging Corporation (KY)

( * ) Notice: Subject to any disclaimer, the term of this patent is extended or adjusted under 35 U.S.C. 154(b) by 125 days.

(21) Appl. No.: 11/867,313

(22) Filed: Oct. 4, 2007

(65) Prior Publication Data

US 2009/0090844 A1 Apr. 9, 2009

(51) Int. Cl.
*H01L 27/00* (2006.01)
*H01J 40/14* (2006.01)

(52) U.S. Cl. .............. 250/208.1; 250/214 R; 327/514; 348/308

(58) Field of Classification Search .............. 250/208.1, 250/214 R, 214 LS; 327/514, 515; 348/303, 348/308
See application file for complete search history.

(56) References Cited

U.S. PATENT DOCUMENTS

| | | | |
|---|---|---|---|
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 2006/0231732 A1 | 10/2006 | Yan | |
| 2006/0238634 A1 | 10/2006 | Yan | |
| 2009/0057536 A1* | 3/2009 | Hirose | 250/208.1 |
| 2009/0059047 A1* | 3/2009 | Murata et al. | 348/297 |

\* cited by examiner

*Primary Examiner*—Kevin Pyo

(57) ABSTRACT

Apparatus, methods, and systems for providing a uniform bias voltage in a biasing circuit to a plurality of pixels. The biasing circuit has a plurality of switches, including a first switch connected at a first end of a capacitor and a second end connected to a first ground. A second switch is connected at a first end to a bias voltage reference and at a second end to a gate of a biasing transistor and a second end of the capacitor. A third switch is connected at a first end to the first end of the capacitor and at a second end to the drain of the biasing transistor and a second ground. The first and the second switch are closed and the third switch is open to set a bias voltage on the capacitor. The first and second switch are open and the third switch is closed when the bias voltage is set on the capacitor.

24 Claims, 7 Drawing Sheets

BIASING APPARATUS, SYSTEMS, AND METHODS

BACKGROUND

A complementary metal-oxide semiconductor (CMOS) imager circuit includes a focal plane array of pixel cells, each of the cells including a photo sensor such as, for example, a photo gate, photoconductor or a photodiode for accumulating photo-generated charge in the specified portion of the substrate. Each pixel cell has a charge storage region, formed on or in the substrate, which is connected to the gate of an output transistor that is part of a readout circuit. The charge storage region may be constructed as a floating diffusion region.

In a CMOS imager, the active elements of each pixel cell may perform the functions of: photon to charge conversion, accumulation of image charge, resetting the storage region to a known state, transfer of charge from the photo sensor to the storage region, selection of a pixel for readout, and output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known and described in, for example, U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc.

DETAILED DESCRIPTION

Figure 1:
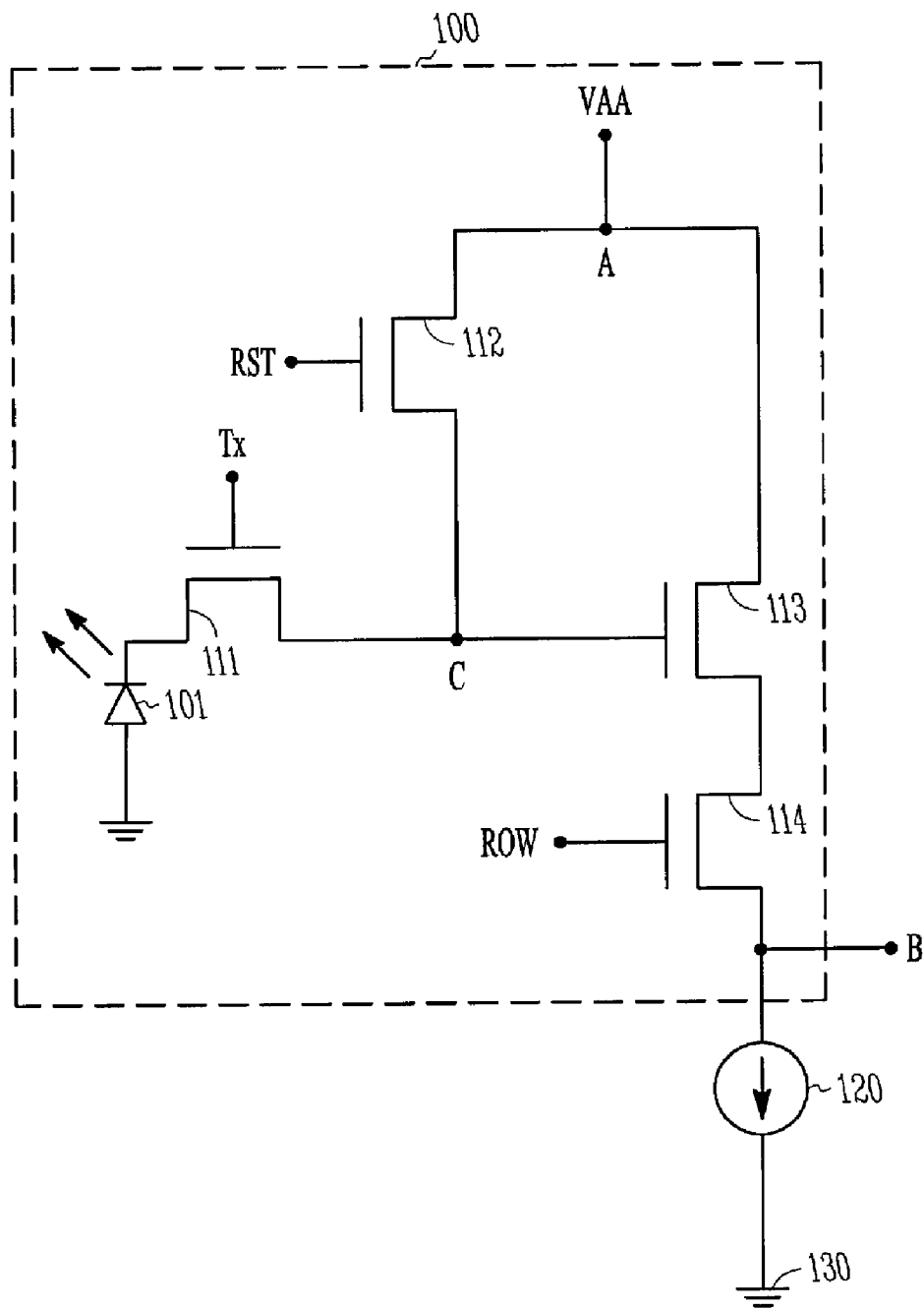
FIG. 1 is a prior art illustration of a four-transistor pixel and an associated biasing circuit.

FIG. 1 is a prior art illustration of a conventional four-transistor (4T) pixel 100 and an associated biasing circuit 120 (shown here as a current source). The pixel 100 includes a light-sensitive element 101, shown as a photodiode, a floating diffusion region C, and four transistors: a transfer transistor 111, a reset transistor 112, a source follower transistor 113, and a row select transistor 114. The pixel 100 accepts a transmit control signal Tx for controlling the conductivity of the transfer transistor 111, a reset signal RST for controlling the conductivity of the reset transistor 112, and a ROW control signal for controlling the conductivity of the row select transistor 114. The charge at the floating diffusion region C controls the conductivity of the source follower transistor 113. The output of the source follower transistor 113 is presented to the biasing circuit 120 through the row select transistor 114, which outputs a pixel signal at node B when the row select transistor 114 is conducting. Both biasing circuit 120 and light-sensitive element 101 are shown connected to ground 130. These may be different ground lines in the circuit.

The states of the transmit transistor 111 and reset transistor 112 determine whether the floating diffusion region C is coupled to the light-sensitive element 101 for receiving either a photo-generated charge from the light-sensitive element 101 during a charge integration period, or a source of pixel power VAA from node A during a reset period.

The pixel 100 is operated as follows. The ROW control signal is asserted to cause the row select transistor 114 to conduct. At the same time, the reset signal RST is asserted while the transmit control signal TX is not asserted. This couples the floating diffusion region C to the pixel power VAA at node A, and resets the voltage at node C to the pixel power VAA. The pixel 100 outputs a reset signal Vrst to the biasing circuit 120. Node B is coupled between the ROW select transistor 114 and the biasing circuit 120.

After the reset signal Vrst has been output, the reset signal RST is de-asserted. The light-sensitive element 101 is exposed to incident light and accumulates charge on the level of the incident light during a charge integration period. After the charge integration period, the transmit control signal TX is asserted. This couples the floating diffusion region C to the light-sensitive element 101. Charge flows through the transfer transistor 111 and diminishes the voltage at the floating diffusion region C. The pixel 100 outputs a photo signal to the biasing circuit 120 and an output voltage is presented at node B and to be sampled by a sample and hold circuit (not shown), well-known to those of ordinary skill in the art.

The biasing circuit 120 sets a bias for the output at node B. Imaging sensors such as described in FIG. 1 often include thousands of sensors. For greater accuracy in the output from the various pixels it is desirable that the biasing circuits utilize the same bias voltage. The inventors have discovered that failure to do so may introduce artifacts in the output at node B.

Figure 2:
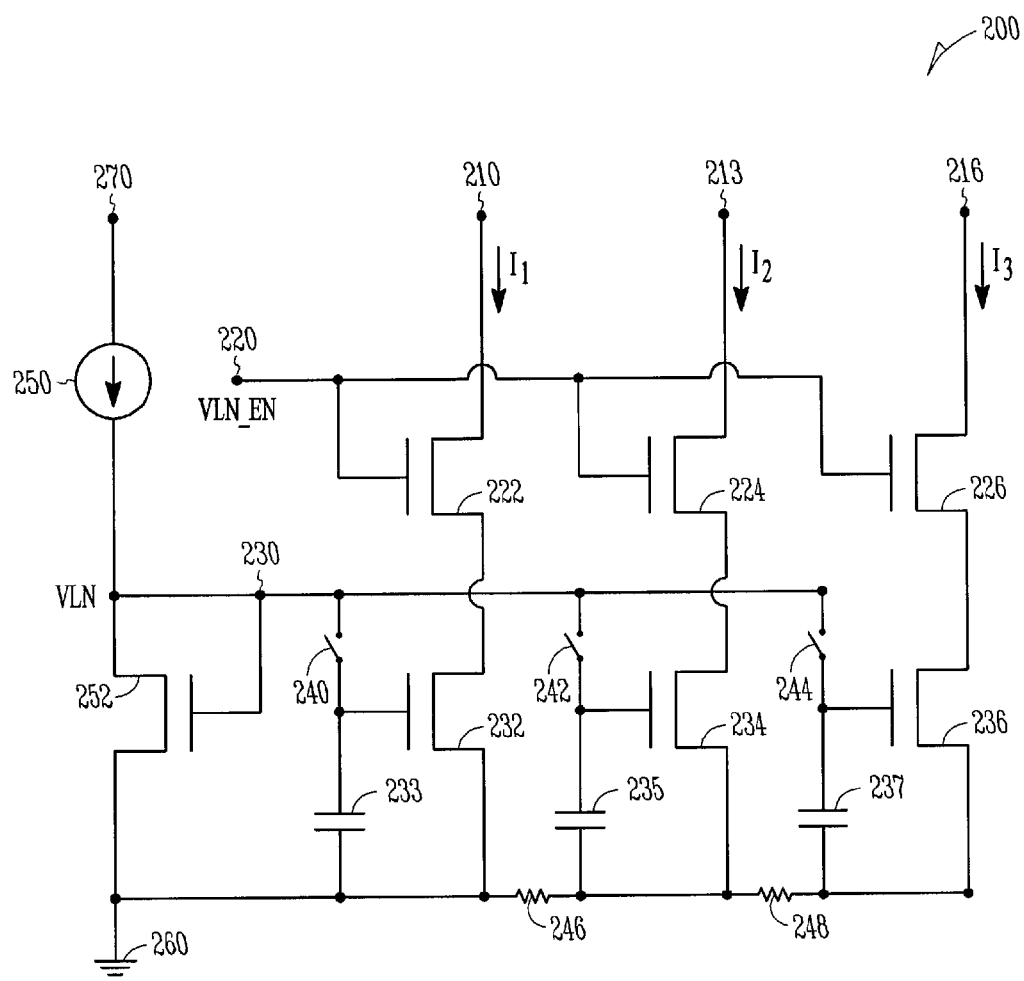
FIG. 2 is an illustration of a prior art biasing circuit.

FIG. 2 is a prior art illustration of a conventional biasing circuit 200. The biasing circuit 200 is utilized to bias multiple pixels such as pixel 100 of FIG. 1. The outputs from the pixels is provided at node B of FIG. 1 for pixel 100, are provided as pixel outputs 210, 213, and 216. While only three pixel outputs 210, 213 and 216 are illustrated, the biasing circuit 200 may be utilized with a far greater number of pixel outputs than three. For example, it is common for biasing circuits to provide biasing for thousands of pixels in a single system.

To set the biasing voltage, VLN, at each of the capacitors 233, 235 and 237, a biasing voltage, VLN, at the node 230 is asserted. A bias circuit engage signal, VLN_EN is asserted at node 220 to energize transistors 222, 224, and 226, causing the transistors 232, 234 and 236 to conduct currents I1, I2, and I3 respectively. The biasing voltage (VLN) is provided at node 230 to switches 240, 242, and 244. When switches 240, 242 and 244 are closed and the bias circuit engage signal VLN_EN at node 220 is asserted, the biasing voltage, VLN, at node 230 is sampled into capacitors 233, 235 and 237 respectively. VLN at node 230 is set via a source follower transistor 252 connected to ground 260 and supplied with a current from current supply 250. Current supply 250 is connected to voltage source node 270 which provides a source voltage.

When the voltage at the capacitors 233, 235 and 237 settles, the switches 240, 242 and 244 are opened and a bias voltage on capacitors 233, 235 and 237 is set. This sample and hold procedure helps to overcome possible ground effects in subsequent signal sampling.

The inventors have discovered that due to routing resistance in the ground line, as represented by the resistors 246 and 248, voltage drops may occur when a current passes through resistors 246 and 248, causing capacitors 233, 235 and 237 to sample different voltages. Since the transistors 232, 234 and 236 are energized, the current through transistor 232 may be equivalent to $I_1$, the current through transistor 234 may be equivalent to $I_2$, and the current through transistor 236 may be equivalent to $I_3$. As a result, the voltage across the capacitor 233 may be equal to the voltage at node 230. The voltage across capacitor 235 may be found using the formula:

Voltage at Cap 235=$VLN-(I_2+I_3)$×(resistor 246)

The voltage across capacitor 237 may be found using the equation:

Voltage at Cap 237=$VLN-((I_2+I_3)$×(resistor 246))−$(I_3$×(resistor 248))

As a result a gradient is introduced into the biasing voltages across the capacitors and the actual voltage across all of the capacitors will not be equal to VLN. In addition it can be seen that as the number of biasing circuits increases in the network, the issue will be compounded. The inventors have discovered that this gradient may affect the source follower gain in the pixel, for example, source follower transistor 113 of FIG. 1, and may cause artifacts in the CMOS imaging sensor.

Figure 3:
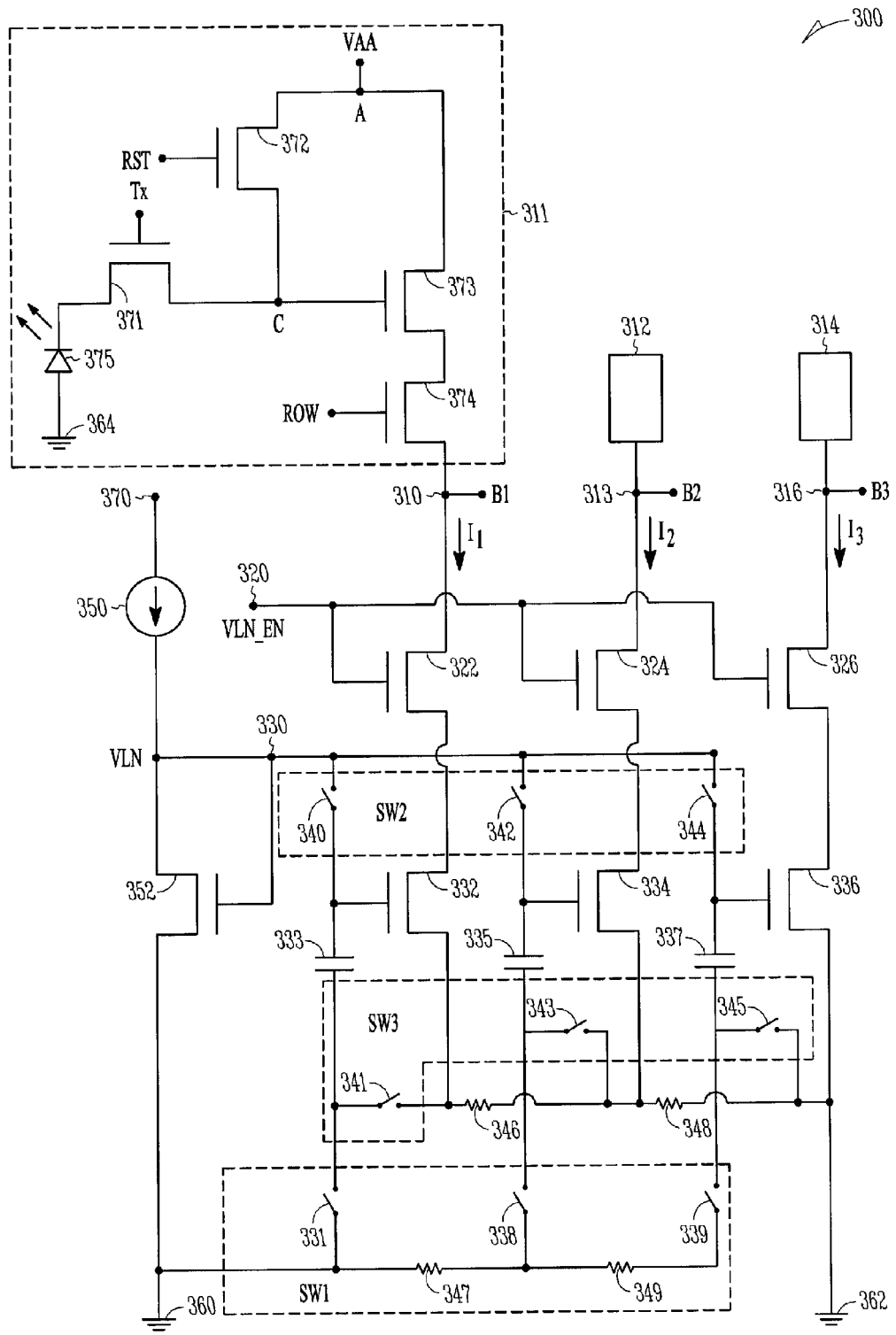
FIG. 3 illustrates a biasing circuit according to an embodiment of the invention.

FIG. 3 shows a biasing circuit 300 according to an embodiment of the invention. Pixels 311, 312 and 314 provide pixel outputs at the nodes 310, 313 and 316 to the source for transistors 322, 324 and 326 respectively. The drains of the transistors 322, 324 and 326 are provided to the sources of biasing transistors 332, 334 and 336 respectively. A bias circuit engage signal VLN_EN is asserted at node 320 to energize transistors 322, 324, and 325. VLN is set at node 330 via current source 350 and current mirror 352. Current source 350 is connected to a supply voltage at node 370 and current mirror 352 is connected to ground 360.

Pixel 311 is representative of pixels 312 and 314. The pixel 311 includes a light-sensitive element 375, shown as a photodiode, a floating diffusion region C, and four transistors: a transfer transistor 371, a reset transistor 372, a source follower transistor 373, and a row select transistor 374. The pixel 311 accepts a transmit control signal TX for controlling the conductivity of the transfer transistor 371, a reset signal RST for controlling the conductivity of the reset transistor 372, and a ROW control signal for controlling the conductivity of the row select transistor 374. The charge at the floating diffusion region C controls the conductivity of the source follower transistor 373. The output of the source follower transistor 373 is provided at pixel output node 310 through the row select transistor 374, which outputs a pixel signal at node B1 when the row select transistor 374 is conducting. Light-sensitive element 375 is shown connected to ground 364.

The biasing voltage, VLN, is set at capacitors 333, 335 and 337 utilizing a plurality of switches. For ease of understanding the switches shall be grouped. A first group of switches, SW1, includes switches 331, 338 and 339. A second group of switches, SW2, includes switches 340, 342, and 344. Finally a third group of switches, SW3, includes switches 341, 343, and 345.

To set the bias voltage on capacitors 333, 335, and 337, switches SW1 and SW2 are closed and switches SW3 are opened. This will cause the current biasing transistors 332, 334 and 336 to flow to ground 362. As with the example in FIG. 2, routing resistance will exist to in the line to ground 362. The routing resistance in the ground line to ground 362 is represented by resistors 346 and 348.

Due to switches SW3 being open and switches SW1 being closed, capacitors 333, 335, and 337 are connected between the biasing voltage, VLN, at node 330 and ground 360. As with the earlier example in FIG. 2, the line to ground 360 also exhibits line resistance as represented by resistors 347 and 349. Since the currents I1, I2 and I3 are flowing through resistors 346 and 348 to ground 362 and not to ground 360, there is no significant voltage drop across resistors 347 and 349 due to the minimal current flow through the line to ground 360. Thus, the voltage across each of capacitors 333, 335 and 337 will be equivalent to VLN. Once the voltage across capacitors 333, 335, and 337 stabilizes, switches SW1 and SW2 opened and switches SW3 closed for operation of the biasing circuit. SW1 is opened before SW2 to do bottom-plate sampling and to avoid current passing through SW3 after SW3 is closed. Once SW1 and SW2 are opened and SW3 are closed, transistors 332, 334, and 336 will get uniform biasing voltage across their gate and source, even though voltage drop still appears across resistors 346 and 348. Such uniform biasing voltage helps to minimize column-wise fixed pattern noise.

Figure 4:
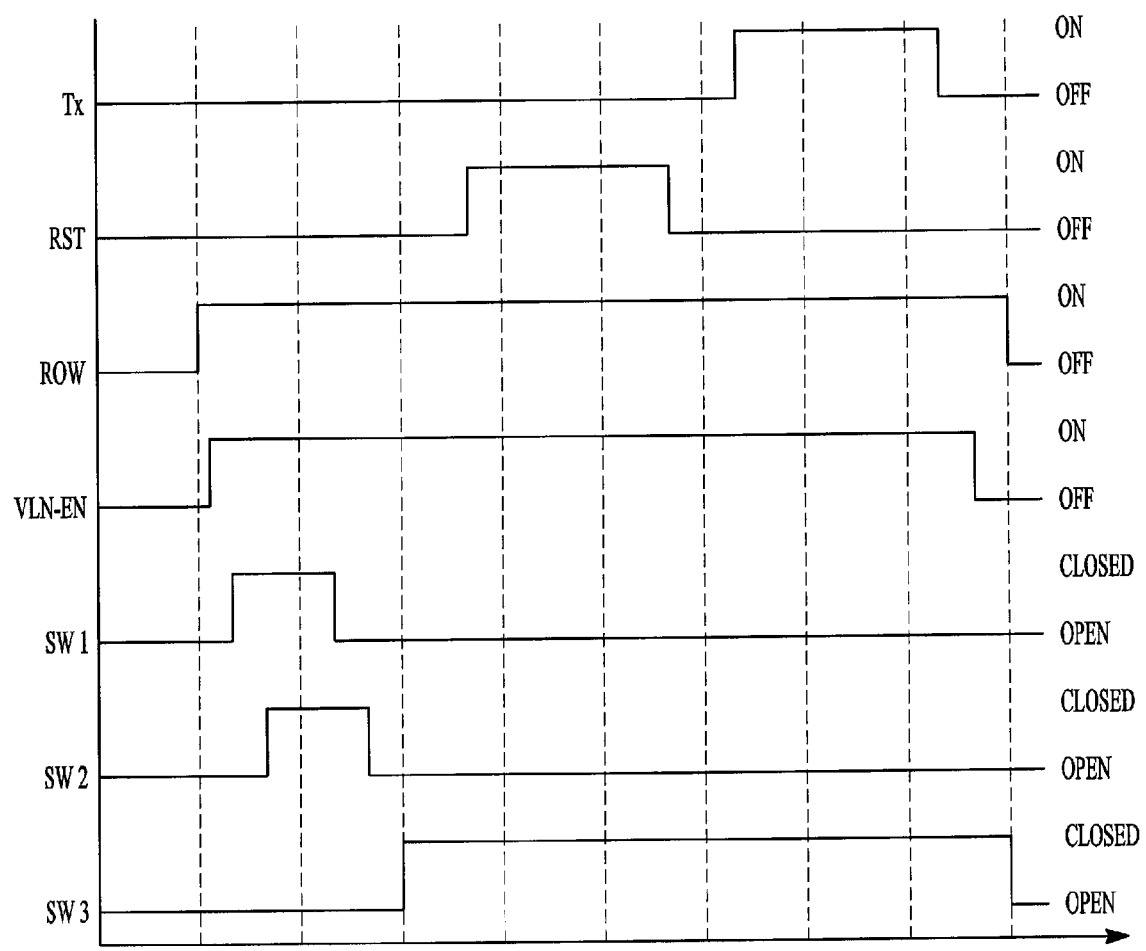
FIG. 4 is a timing diagram for pixels and biasing circuit according to an embodiment of the invention.

FIG. 4 is a timing diagram for pixels and biasing circuit 300 according to an embodiment of the invention. The timing diagram may be understood by referring to FIG. 3. Initially a ROW input will be received by row select transistor 374, energizing row select transistor 374. VLN_EN is then engaged to energize the first set of transistors, represented as transistors 322, 324 and 326 in FIG. 3. Switches SW3 should be open from a prior cycle. Switches SW1 are then closed, followed by closing switches SW2. A bias voltage is then established on capacitors 333, 335 and 337. Once a bias voltage is established, switches SW1 and SW2 are opened and switches SW3 are closed. An reset signal RST control signal is then provided to reset node C for pixel 311, and then removed when node C is reset. Next, the transmit control signal TX is provided and the output from light-sensitive element 375 is provided at the output of the pixel 311 and is read at node B. The transmit control signal TX is then disengaged, followed by the disengagement of VLN_EN and ROW. Switches SW 3 are then opened prior to the next cycle; this action may occur at the same time as disengagement of the signals VLN_EN and ROW, or later.

Figure 5:
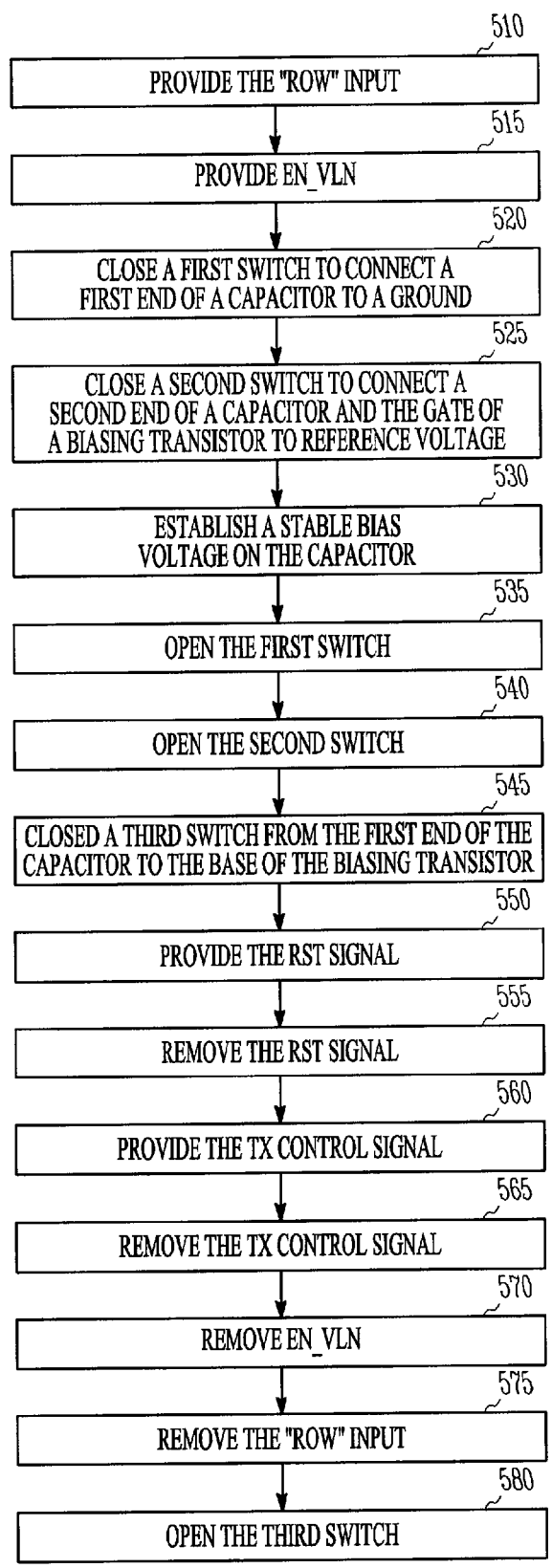
FIG. 5 shows a flow diagram of a method of setting the bias voltage according to an embodiment of the invention.

FIG. 5 shows a flow diagram of a method of setting the bias voltage according to an embodiment of the invention. Activity 510 may include providing a ROW input to row select transistor 374. Activity 515 may be to provide a bias circuit engage voltage (VLN_EN) to a first set of transistors such as transistors 322, 324 and 326 of FIG. 3. Activity 520 may be to close one or more first switches, such as switch SW1 of FIG. 3 at a first end of a capacitor to connect to the first end of a capacitor to a first ground. Activity 525 may be to close one or more second switches, such as switch SW2 of FIG. 3, to connect the second end of a capacitor and the gate of a biasing transistor to a biasing voltage (VLN). Activity 530 may be to establish a stable bias voltage on the capacitor, such as capacitor 333, 335, and 337 of FIG. 3. Activity 535 may be to open the first switch SW1. Activity 540 may be to open the second switch SW2. Activity 545 may be to close one or more third switches such as switch SW3 of FIG. 3, from a capacitor to a first ground. Activity 550 may be to provide a reset signal RST to a pixel to reset the pixel output. Activity 555 may be to remove the RESET SIGNAL RST signal. Activity 560 may be to provide a transmit control signal TX to a pixel to transmit the output of a light-sensitive element to the output of the pixel. Activity 565 may be to remove the transmit control signal TX. Activity 570 may be to open the third switch SW3.

Figure 6:
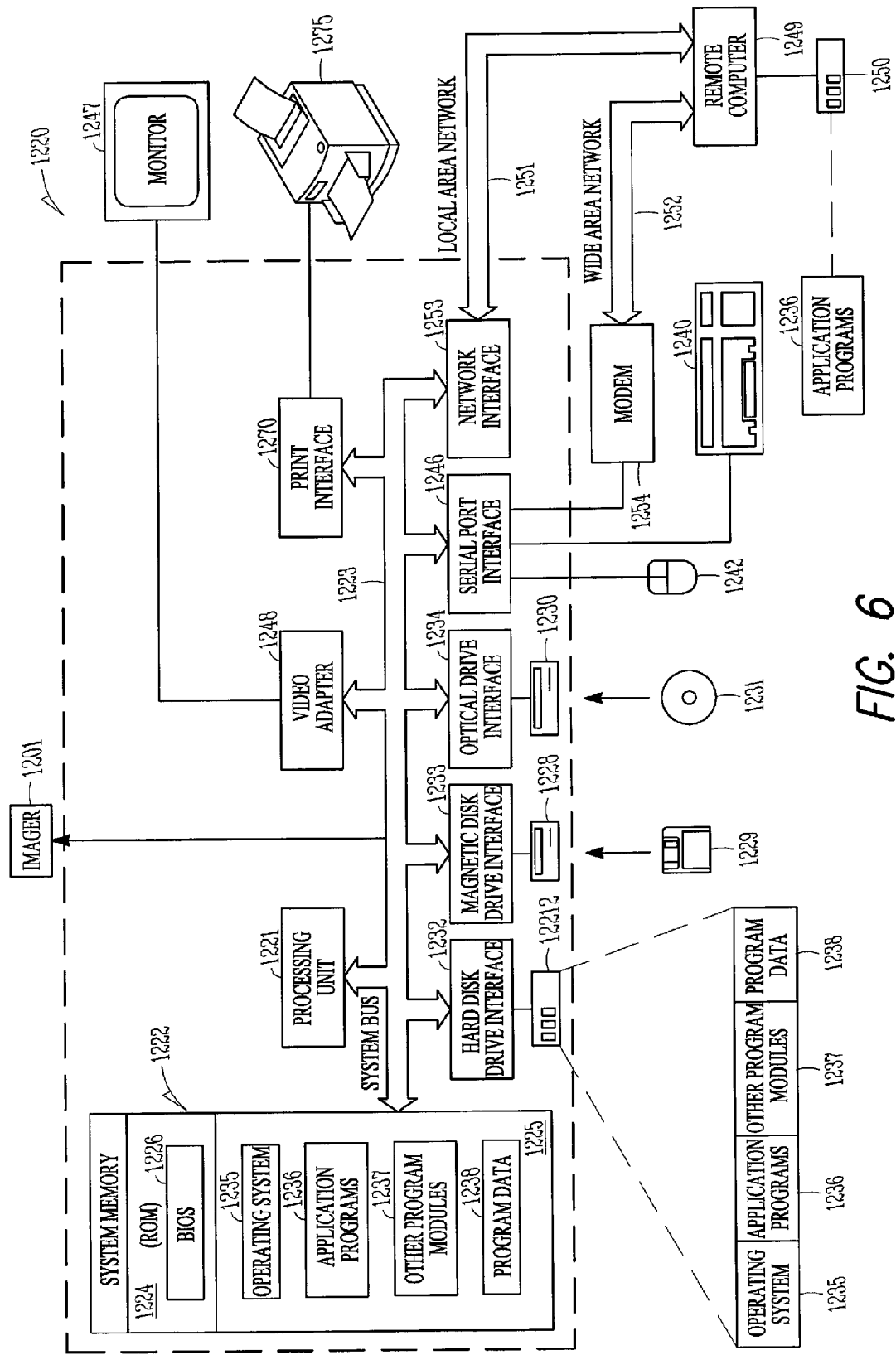
FIG. 6 shows a block diagram of a system including the hardware and operating environment of a suitable computer in conjunction with which embodiments of the invention may be practiced.

FIG. 6 shows a general-purpose computing device 1220, for example a personal computer, which includes processing unit 1221, system memory 1222, and system bus 1223 that couples the system memory 1222 and other system components to processing unit 1221. System bus 1223 may be any of several types, including a memory bus or memory controller, a peripheral bus, and a local bus, and may use any of a variety of bus structures. System memory 1222 includes read-only memory (ROM) 1224 and random-access memory (RAM) 1225.

A basic input/output system (BIOS) 1226, stored in ROM 1224, contains the basic routines that transfer information between components of personal computer 1220. BIOS 1226 may also contain start-up routines for the system. Personal computer 1220 further includes hard disk drive 12212, magnetic disk drive 1228 for reading from and writing to a removable magnetic disk 1229, and optical disk drive 1230 for reading from and writing to a removable optical disk 1231 such as a CD-ROM (compact disc read only memory), DVD (digital versatile disc or digital video disc) or other optical medium. Hard disk drive 12212, magnetic disk drive 1228, and optical disk drive 1230 are connected to system bus 1223 by a hard-disk drive interface 1232, a magnetic-disk drive interface 1233, and an optical-drive interface 1234, respectively. The drives and their associated computer-readable media provide nonvolatile storage of computer-readable instructions, data structures, program modules and other data for personal computer 1220. Although the environment described herein employs a hard disk drive 12212, a removable magnetic disk 1229 and a removable optical disk 1231, those skilled in the art will appreciate that other types of computer-readable media that may store data accessible by a computer may also be used in the operating environment. Such media may include magnetic cassettes, flash-memory cards, DVD, Bernoulli cartridges, RAMs, ROMs, and the like.

Program modules may be stored on the hard disk drive 12212, removable magnetic disk 1229, removable optical disk 1231, ROM 1224 and RAM 1225. Program modules may include operating system 1235, one or more application programs 1236, other program modules 1237, and program data 1238. A user may enter commands and information into personal computer 1220 through input devices such as a keyboard 1240 and a pointing device 1242. Other input devices (not shown) may include a microphone, joystick, game pad, satellite dish, scanner, or the like. These and other input devices are often connected to the processing unit 1221 through a serial-port interface 1246 (e.g., universal serial bus (USB)) coupled to system bus 1223, but they may be connected through other interfaces not shown in FIG. 6, such as a parallel port, a game port, Institute of Electrical and Electronics Engineers (IEEE) 1394 port, etc. A monitor 1247 or other display device also connects to system bus 1223 via an interface such as a video adapter 1248. In addition to the monitor, computer 1220 may include other peripheral output devices such as printer 1275. A print interface 1270 may be connected to system bus 1223 and to printer 1275.

Personal computer 1220 may operate in a networked environment using logical connections to one or more remote computers such as remote computer 1249. Remote computer 1249 may be another personal computer, a server, a router, a network PC, a peer device, or other common network node. It typically includes many or all of the components described above in connection with personal computer 1220; however, only a remote storage device 1250 is illustrated in FIG. 6. The logical connections depicted in FIG. 6 include local-area network (LAN) 1251 and wide-area network (WAN) 1252. Such networking environments are commonplace in offices, enterprise-wide computer networks, intranets and the Internet.

When placed in a LAN networking environment, personal computer 1220 connects to LAN 1251 through a network interface or adapter 1253. When used in a WAN networking environment such as the Internet, personal computer 1220 typically includes modem 1254 or other means for establishing communications over WAN 1252. Modem 1254 may be internal or external to personal computer 1220, and connects to system bus 1223 via serial-port interface 1246. In a networked environment, program modules, such as those comprising Microsoft® Word, which are depicted as residing within computer 1220 or portions thereof, may be stored in remote storage device 1250. Of course, the network connections shown are illustrative, and other means of establishing a communications link between the computers may be substituted.

An imager 1201 may be connected to system bus 1223. Embodiments of the invention may be operated by personal computer 1220. Imager 1201 may incorporate pixels and biasing circuits 300 such as that taught in FIG. 4.

Figure 7:
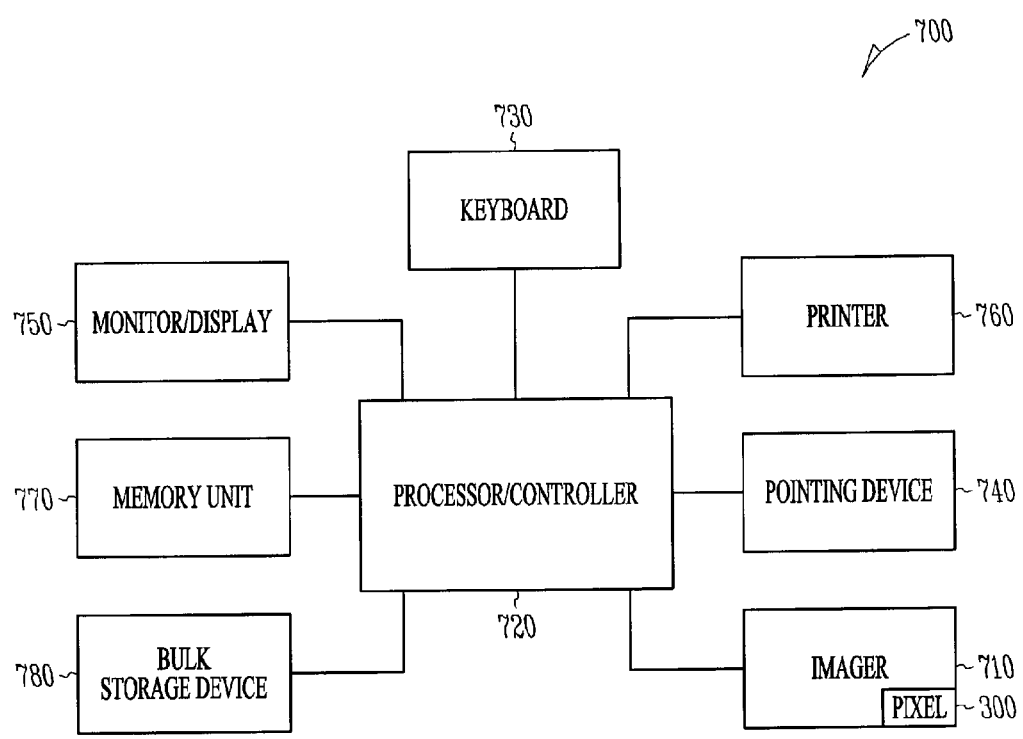
FIG. 7 is a block diagram illustrating an optical imaging system according to various embodiments of the invention.

FIG. 7 illustrates a block diagram of an imaging system 700, according to one embodiment of the invention. Imaging system 700 may include an optical imager 710 and a processor/controller 720. The imaging system 700 also serves as an example of an electronic system containing another electronic system, i.e., optical imager 710, as a subcomponent. The imaging system 700 optionally contains user interface components, such as a keyboard 730, a pointing device 740, a monitor/display 750, a printer 760, a memory unit 770 such as a dynamic random access memory, and a bulk storage device 780. Other components associated with imaging system 700, such as modems, device driver cards, additional storage devices, etc. may also be included. The optical imager 710, the memory unit 770, and the processor/controller 720 may be incorporated on a single integrated circuit. Such single package processing units may operate to reduce image processing time and costs. The optical imager 710 may contain pixels and biasing circuit 300, as shown in FIG. 3. In some embodiments, pixels and biasing circuit 300 may contain a structure or element in accordance with embodiments of the invention. Examples of imaging system 700 comprising an optical imager 710 that may incorporate pixels and biasing circuit 300 according to the various embodiments of the invention include automobile motion sensor systems, security systems, surveillance systems, digital radiography systems, mammography systems, dental imaging systems, glucose monitoring systems, pulse oximetry systems, digital photography systems, hand-held communication systems, robotic systems, machine vision systems, aircraft systems, night vision systems, fluorescence systems, chemiluminescence systems, thermal imaging systems, as well as other systems that sense, detect, or use reflected, transmitted, or absorbed electromagnetic energy to form an image.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. While the illustrations used were indicative of a multi-lun device indicating the active status of a die, the intention of the inventor is that the description above could easily be adapted for use in any situation where bus contention may arise. Thus the following claims are hereby incorporated into the Detailed Description, with each claim standing on its own as a separate embodiment.

What is claimed is:

1. An apparatus comprising:
   a first input to provide a biasing voltage;
   a plurality of pixels providing a corresponding plurality of pixel outputs; and
   a plurality of biasing circuits, each of said plurality of biasing circuits connected to one of said plurality of pixels, wherein each of said biasing circuits comprises:
      a biasing transistor having a source, a drain, and a gate, the source to receive a pixel output included in the plurality of pixel outputs;
      a first switch having a first end connected to a first end of a capacitor, and a second end of the first switch connected to a first ground;
      a second switch having a first end connected to the first input, and having a second end connected to a gate of a biasing transistor and a second end of the capacitor; and
      a third switch having a first end connected to the first end of the capacitor, and a second end of the third switch connected to the drain of the biasing transistor and a second ground, wherein the first and the second switch are to close and the third switch is to open to set a bias voltage on the capacitor, and wherein said first and said second switches are to open and said third switch is to close when the bias voltage is set on the capacitor.

2. The apparatus of claim 1, wherein each of the biasing circuits further comprise:
   an enabling transistor to provide the pixel output to the source of the biasing transistor.

3. The apparatus of claim 2, wherein the enabling transistor is enabled when the first and the second switches are closed.

4. The apparatus of claim 1, wherein each of said plurality of pixels further comprise:
   a row select transistor to provide the pixel output.

5. The apparatus of claim 2, wherein each of said plurality of pixels further comprise:
   a row select transistor to provide the pixel output.

6. The apparatus of claim 5, wherein the first and the second switches are to close when the enabling transistor and the row select transistor are enabled to set a biasing voltage on the capacitor.

7. The apparatus of claim 6, wherein each of the plurality of pixels further comprises:
   a transmit transistor and a reset transistor, wherein the reset transistor is to be energized after the third switch is closed to reset a pixel, and wherein the transmit transistor is to be energized to transmit the pixel output.

8. A method, comprising:
   closing a first switch to couple a first end of a capacitor to a first ground;
   closing a second switch to couple a reference voltage to a second end of the capacitor and a gate of a biasing transistor coupled to a pixel, and to set a bias voltage on the capacitor;
   opening the first switch;
   opening the second switch; and
   closing a third switch to couple the first end of the capacitor to a second ground and a drain of the biasing transistor.

9. The method of claim 8 further comprising:
   providing a ROW input signal to energize a row select transistor and provide an output from the pixel.

10. The method of claim 9, wherein the ROW input signal is provided prior to opening the first switch.

11. The method of claim 9 further comprising:
    providing a reset signal to the pixel after the third switch is closed.

12. The method of claim 11 further comprising:
    providing a transmit signal to the pixel after the reset signal has been provided.

13. The method of claim 12, wherein the reset signal is removed prior to providing the transmit signal.

14. The method of claim 13, wherein the transmit signal is removed after an output from the pixel is read.

15. The method of claim 14, wherein the row input signal is removed after an output from the pixel is read.

16. The method of claim 15, wherein the third switch is opened after the row input signal is removed.

17. The method of claim 8, further comprising:
    providing a bias circuit engage signal.

18. The method of claim 17, wherein the bias circuit engage signal is provided prior to opening the first switch.

19. The method of claim 10, further comprising providing a bias circuit engage signal to a transistor to provide a pixel output from the pixel to the biasing transistor prior to opening the first switch.

20. The method of claim 19, wherein the bias circuit engage signal is removed after an output from the pixel is read.

21. The method of claim 20, wherein the third switch is opened after the bias circuit engage signal is removed.

22. A system, comprising a first input to provide a biasing voltage;
    a plurality of pixels providing pixel outputs;
    a plurality of biasing circuits, each of said plurality of biasing circuits connected to one of said plurality of pixels wherein each of said biasing circuits comprises:
       a biasing transistor having a source, a drain, and a gate, the source to receive a pixel output included in the plurality of pixel outputs;
       a first switch having a first end connected to a first end of a capacitor, and a second end of the first switch connected to a first ground;
       a second switch having a first end connected to the first input, and having a second end connected to a gate of a biasing transistor and a second end of the capacitor; and
       a third switch having a first end connected to the first end of the capacitor, and a second end of the third switch connected to the drain of the biasing transistor and a second ground, wherein the first and the second switch are to close and the third switch is to open to set a bias voltage on the capacitor, and wherein said first and said second switches are to open and said third switch is to close when the bias voltage is set on the capacitor; and
    a processor to receive the plurality of pixel outputs and to process the plurality of pixel outputs to construct a portion of an image.

23. The system of claim 22, further comprising a hard disk drive to store the portion of the image.

24. The system of claim 22, further comprising a memory unit to store the portion of the image.

* * * * *